2 Sheets—Sheet 1.

G. W. & H. F. ROBERSON.
Combined Harrow and Seeding-Machine.

No. 202,873. Patented April 23, 1878.

Attest:
August Petersohn
Jno. P. Brooks

Inventor:
George W. & Henry F. Roberson,
by: C. A. Snow & Co.
Attorneys.

N. PETERS, PHOTO-LITHOGRAPHER, WASHINGTON, D. C.

2 Sheets—Sheet 2.
G. W. & H. F. ROBERSON.
Combined Harrow and Seeding-Machine.
No. 202,873. Patented April 23, 1878.
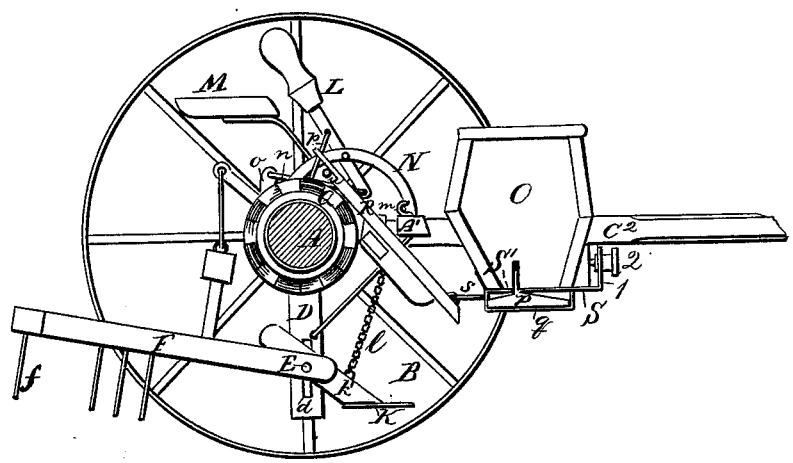
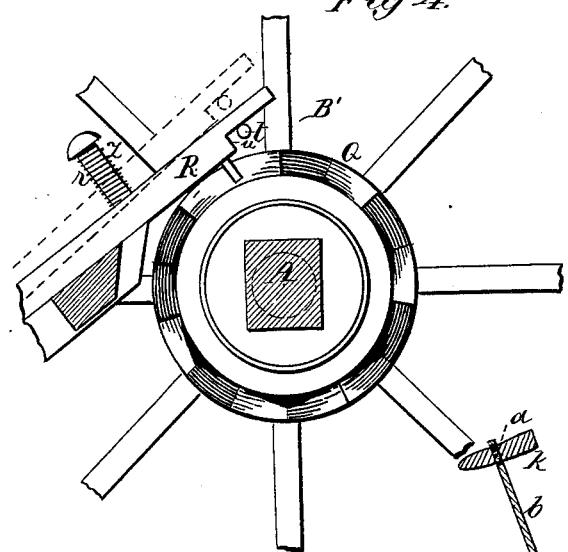
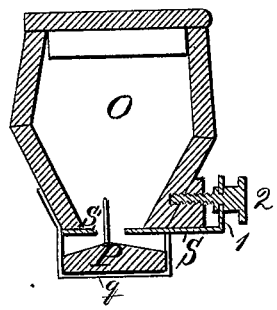
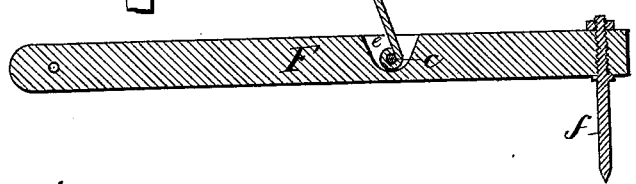
Attest:
August Petersohn
Jno. P. Brooks.
Inventor.
George W. & Henry F. Roberson
by C. A. Snow & Co.
Attorneys.
N. PETERS, PHOTO-LITHOGRAPHER, WASHINGTON, D. C.

UNITED STATES PATENT OFFICE.

GEORGE W. ROBERSON AND HENRY F. ROBERSON, OF SHUSHAN, NEW YORK.

IMPROVEMENT IN COMBINED HARROW AND SEEDING-MACHINE.

Specification forming part of Letters Patent No. 202,873, dated April 23, 1878; application filed January 28, 1878.

*To all whom it may concern:*

Be it known that we, GEORGE W. ROBERSON and HENRY F. ROBERSON, of Shushan, in the county of Washington and State of New York, have invented certain new and useful Improvements in Combined Harrow and Seeding-Machine; and we do hereby declare that the following is a full, clear, and exact description thereof, which will enable others skilled in the art to which it appertains to make and use the same, reference being had to the accompanying drawings, which form a part of this specification, and in which—

Figure 1:
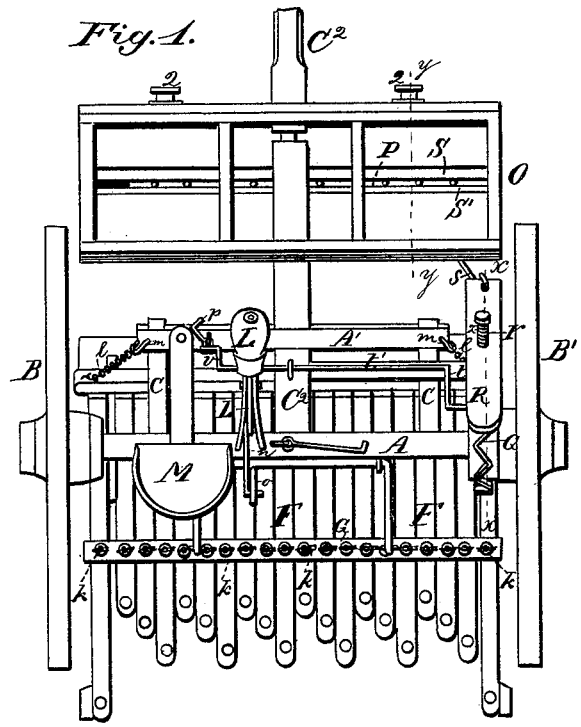
Figure 2:
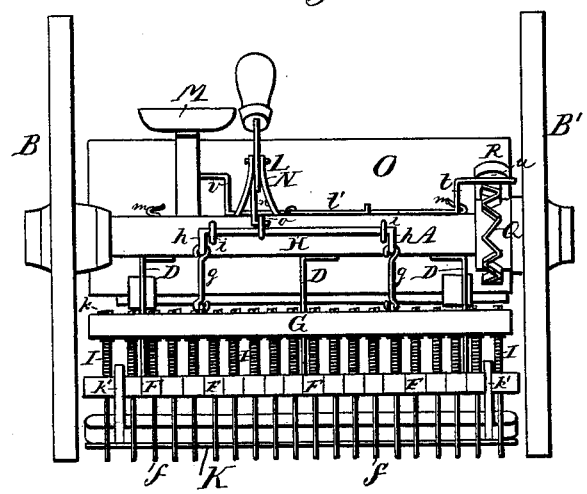

Figure 1 is a top plan. Fig. 2 is a rear elevation. Fig. 3 is a side elevation, one of the wheels having been removed. Fig. 4 is a vertical section on the line $x\ x$, Fig. 1. Fig. 5 is a similar section of the seed-box after the line denoted by $y\ y$, and Fig. 6 is an enlarged longitudinal section of one of the drag-bars detached from the machine.

Similar letters of reference indicate corresponding parts in all the figures.

Our invention relates to a combined harrow and seeding-machine; and it consists in the construction and combination of parts of such a machine, having for its object to produce a combined harrow and seeder at a minimum cost which shall do its work effectually and well under all conditions and circumstances, be light of draft, easy to control and regulate, and adapted for any kind of seed or soil.

In the drawing, A is the axle, and B B' the wheels. $C^2$ is the pole or tongue, which is inserted into the middle of the axle, and has mortised into it the cross-piece A', which is parallel to axle A, and united thereto by the pieces C C. Projecting downward from the axle, to which they are rigidly secured, are three or more arms, D D D, slotted at their ends, as shown at $d$, Fig. 3. Through these slots, which are exactly opposite to and correspond with each other, passes a rod, E, upon which the long and short drag-bars F are pivoted. Each of these drag-bars has a stout tooth, $f$, secured to its end, and about midway between the pivoting-point and tooth a slot, $e$, Fig. 6, through which passes a pin, $c$. $b$ is a short rod, pivoted on the pin $c$ in slot $e$, and having an eye, $a$, at its other end. The drag-bars are held in place by the cross-bar G, which is hung, by the rods or chains $g\ g$, in the arms $h\ h$ of rod H, which is hinged by staples $i\ i$ to axle A.

The rods $b$ of the drag-bars pass through vertical and equidistant perforations in the cross-bar G, and are prevented from slipping out by pins or wedges $k$, inserted through the eyes $a$ of rods $b$. I are coiled springs placed around each of the rods $b$, and abutting at one end against the under side of cross-bar G, and at the other against the drag-bar.

K is a drag or scraper secured in short arms $k'$, which are pivoted upon rod E. This scraper may be raised, lowered, or adjusted at any suitable height and angle by means of chains $l\ l$, the links of which may be secured on hooks $m\ m$ on each end of the cross-piece A'. The drag-bars may be raised or lowered by the lever L, the handle of which is within easy reach of the driver's seat M. The end of lever L is connected by a rod, $n$, with a projecting arm or crank, $o$, upon rod H, and lever L, which has its fulcrum in the segment N, may be retained in its raised position (lifting the drag-bars up from the ground and out of operation) by a hook, $p$, the end of which passes through a perforation in the lever above its fulcrum, or in any other suitable manner.

O is the seed-box, which is divided off into three or more compartments, and secured upon tongue $C^2$, which passes through it. P is the toothed seed rake or slide, secured in keepers $q$ below the longitudinal slot or opening in the bottom of the seed-box. A reciprocating motion is imparted to slide P by the cam-wheel Q, which is concentric with and secured upon the inner hub of wheel B'. Cam-wheel Q engages with a reciprocating slanting lever, R, having its fulcrum on the pin or bolt $r$, and to the lower end of which is pivoted the connecting-rod $s$, the other end of which is pivoted in the seed-slide. Lever R may be thrown out of gear with the cam-wheel, to stop the operation of the seeding attachment, by the bent arm $t$ of rod $t'$, which takes in under a shoulder, $u$, in the top end of lever R. This rod is operated by a treadle, $v$, at its other end, within convenient reach of the driver's feet. When the stop-pin $t$ is thrown down arm R is forced against the cam-wheel Q by a spring, $z$, placed upon bolt $r$.

S is the gage strip or plate, by means of which the quantity of seed to be dropped is regulated. This strip is secured in brackets 1 1, the ends of which are bent so as to project up on the front side of the seed-box, and perforated to allow set-screws 2 2 to pass through them. By turning these set-screws, the distance of the gage-strip S from the permanent strip S' opposite may be regulated, thereby allowing much or little grain to pass through, according to whether the slot is wide or narrow.

From the foregoing description the operation of our combined harrow and seeding-machine will be readily understood. As the machine advances and drops the seed, this is covered over evenly by the harrow-teeth which follow. If the ground is rough, it should be gone over first with the harrow and scraper in its lowered position, to even the soil and prepare it for the reception of the seed. The seed, as it is being dropped, is covered by the harrow evenly and smoothly, the slots $d$ in the arms D, from which the harrow is suspended, allowing the latter to rise, so as to ride over any obstructions that may be in the way. By the arrangement and combination of operating-levers, as described, the driver can, from his seat and without stopping, raise either the harrow or the scraper, or both, and throw the seeding mechanism into or out of operation. The harrow, being hung below and back of the axle, facilitates the draft of the machine, and the seed-box with its mechanism, being suspended upon the tongue forward of the axle, may be adjusted to balance the weight of the harrow, thereby relieving all undue strain from the team.

Having thus described our invention, we claim and desire to secure by Letters Patent of the United States—

1. The drag-bars F, pivoted upon rod E, in combination with the drag or scraper K, having pivoted arms $k'$ and slotted brackets D, substantially as and for the purpose herein shown and specified.

2. The combination of the slotted arms or brackets D, rod E, drag or scraper K, having pivoted arms $k'$, and chains $l$, for adjusting the pitch or angle of the scraper, substantially as and for the purpose herein shown and specified.

3. As an improvement in combined harrows and seeding-machines, the combination of the perforated cross-bar G, having rods or chains $g\ g$, for connecting it with suitably-constructed elevating-levers, suspension-rods $h$, having retaining keys or wedges $k$ and springs I, pivoted drag-bars F, rod E, and pivoted arms $k'$, carrying the drag or scraper K, whereby the drag-bars and scraper may be raised simultaneously by operating the lever for elevating cross-bar G, substantially as and for the purpose herein shown and specified.

In testimony that we claim the foregoing as our own we have hereto affixed our signatures in presence of two witnesses.

GEORGE W. ROBERSON. [L. S.]
HENRY F. ROBERSON. [L. S.]

Witnesses:
JNO. F. SHORTT,
W. BAKER.